UNITED STATES PATENT OFFICE.

PIERRE VICTOR VIGIER, OF PARIS, FRANCE.

IMPROVEMENT IN PROCESS FOR PREVENTING INCRUSTATIONS IN STEAM-BOILERS.

Specification forming part of Letters Patent No. 123,310, dated January 30, 1872.

*To all whom it may concern:*

Be it known that I, PIERRE VICTOR VIGIER, of Paris, France, have invented a new and Improved Process for Preventing Incrustation of Steam-Boilers; and I do hereby declare the following to be a full, clear, and exact description thereof, which will enable those skilled in the art to make and use the same.

This invention consists in mixing pulverized steatite or soap-stone with the feed-water of a steam-boiler for the purpose of preventing incrustation.

In carrying out my invention, I add from one and one-half to two and one-half drams of pulverized steatite to each quart of feed-water, the proportion of the steatite mixed with the feed-water being changed according to the smaller or larger quantity of impurities contained in said water.

The pulverized steatite is mixed with a sufficient quantity of water to make a thin paste, which is simply poured into the feed-water well, and this operation is repeated as many times as the boiler holds quarts of water, the water in the well being stirred from time to time so as to make sure of getting the steatite forced into the boiler.

After the requisite quantity of steatite has been fed into the boiler it is not necessary to introduce more steatite into the feed-water until the boiler is cleaned, which, however, ought to be done at frequent intervals—say, once a week—by blowing off its contents at a pressure of from fifteen to twenty pounds per square inch; or, if a thorough cleaning is required, the man-hole plate is taken off and the deposited mud is stirred up so as to be able to wash it out clean.

The advantages of steatite or soap-stone as a prevention of incrustation of steam-boilers are as follows: First, the steatite, being neither acid nor alkaline, does not attack in any way the metallic surfaces with which it comes in contact. Second, it is light and not soluble in water, and it is found again in the mud deposited in the boiler, from which it may be separated and used over and over again. Third, it is very abundant, and of a low price.

What I claim as new, and desire to secure by Letters Patent, is—

The employment of steatite or soap-stone for preventing incrustation of steam-boilers, substantially in the manner herein described.

VIGIER.

Witnesses:
H. BONNEVILLE,
CH. CANAILLY.